United States Patent [19]
Venuti, Jr.

[11] 4,362,085
[45] Dec. 7, 1982

[54] FLIGHT CONTROL SYSTEM

[75] Inventor: Peter R. Venuti, Jr., Turnersville, N.J.

[73] Assignee: The United States of America as represented by the Secretary of the Army, Washington, D.C.

[21] Appl. No.: 154,557

[22] Filed: May 29, 1980

Related U.S. Application Data

[63] Continuation-in-part of Ser. No. 47,522, Jun. 11, 1979, abandoned, which is a continuation-in-part of Ser. No. 853,785, Nov. 21, 1977, abandoned.

[51] Int. Cl.³ .......................... F01B 1/00; F15B 13/16
[52] U.S. Cl. .................................. 91/186; 91/363 A; 416/114; 416/115; 416/162
[58] Field of Search ................. 91/506, 186, 189, 361, 91/363 R, 363 A; 416/114, 157 R, 162, 115

[56] References Cited

U.S. PATENT DOCUMENTS

| 3,256,780 | 6/1966 | Riley et al. | 416/114 |
| 3,733,970 | 5/1973 | Bosch | 91/506 |
| 3,841,586 | 10/1974 | Broadley | 416/114 |
| 4,030,404 | 6/1977 | Meijer | 91/506 |
| 4,243,358 | 1/1981 | Carlock et al. | 416/114 |

Primary Examiner—Paul E. Maslousky
Attorney, Agent, or Firm—Nathan Edelberg; Robert P. Gibson; Norman L. Wilson, Jr.

[57] ABSTRACT

A flight control system is provided for a helicopter furnishing safety features, and providing back up control in the event of failure of controls of the rotary head swashplate of a helicopter. The swashplate is regulated by a series of actuators which are angularly positioned at particular settings around the swashplate. In the event of a control system failure, a supplemental system controls the selected settings for the swashplate, rotary head, and spar root and blade assemblies of the helicopter.

3 Claims, 2 Drawing Figures

FLIGHT CONTROL SYSTEM

PRIOR APPLICATIONS

This application is a continuation-in-part of my application Ser. No. 047,522, filed June 11, 1979, now abandoned, which was a continuation-in-part of my earlier application Ser. No. 853,785, filed Nov. 21, 1977, now abandoned.

BACKGROUND OF THE INVENTION

This invention relates generally to a flight control system. More specifically the invention pertains to helicopter rotor head control means which provide fail-safe functioning of this operational component.

The usual control of the helicopter during its operation is achieved by the provision of a swashplate. The swashplate is tilted about a tilting axis transverse to the rotor shaft to regulate the pitch and functioning of the helicopter blade assembly. Mechanical or servo controls connected by mechanical linkages cause the swashplate to tilt in phase with the cycle of rotation. Such controls have operated reasonably effectively in maintaining precision control over the pitch of the swashplate, thereby regulating the rotary head that supports the various blades of the helicopter blade assembly. However the mechanical linkages are normally so constructed that a failure of any one of the servo mechanisms operatively associated with a linkage (or with a control valve) can result in a loss of control of the helicopter during flight. Thus, particularly during combat conditions, when mechanical controls have been operationally impaired, either by a direct hit, or a curtailing of functioning due to a nearby impacting explosion, substantial loss of life and aircraft has been sustained.

This invention is designed to rectify the problem of loss of swashplate control by the provision of back up control means. An object of this invention is the provision of a control system for maintaining the operation of a flight control system for a helicopter in fail-safe operation under the most adverse of conditions.

Another object of this invention is to provide not only the usual servo mechanical valve means for moving the swashplate actuators, but to provide secondary swashplate actuators responding to the control means built into the flight control system of this invention.

These and other objects will become more apparent to those skilled in the art upon reviewing the summary of this invention, and upon undertaking a study of its preferred embodiment in view of its drawing.

SUMMARY OF THE INVENTION

This invention encompasses the provision of a backup safety system with operational capabilities for the fly-by-wire portion of the flight control system of a helicopter. The invention is designed to create a highly reliable electrically or electronically controlled, hydraulic powered, flight control system which includes efficient redundant control system elements. The redundant control system is electronically coupled to the primary control system, but it is electrically, mechanically, and therefore, physically, isolated from the primary control system.

DETAILED DESCRIPTION OF THE INVENTION

This invention includes a flight control system for a helicopter which utilizes, in the preferred embodiment, six swashplate actuators. These six actuators are clustered into two series of three swashplate actuators, a high force gain series and a low force gain series control means, both series being capable of operating within the same swashplate plane. If a system failure occurs in the swashplate control system, it has no effect upon the other actuator system within the flight control system. The control channels of each system are powered, but they are separated and independent in their operation from each other, with only one operating at a time. The invention provides such a system at much less component weight, with ease of maintenance, and at a much less cost, compared to previous dual-form, fail-safe, operational systems having redundant individual swashplate control actuators.

The swashplate actuators, of each of the two series are arranged into two discrete 120° arrays, spaced around the periphery of the swashplate. In other words each actuator, of a clustered group, either the primary control series of actuators, or the secondary control series of actuators is separated by 120 angular degrees around the near periphery of the swashplate. As stated, one actuated array is operated in the high force gain mode, and the remaining array is operated in the low force gain mode. The high gain actuator array actually carries the swashplate loads, whereas the low gain array is operated for tracking the primary control actuators. Each swashplate actuator is fitted with an actuator control means which is controlled by only one electro-hydraulic valve at any one instant as will be described.

Each of the actuators, there being six in number as previously stated, is controlled by one of two control channels. Each control channel controls the electrohydraulic valves of its series and each of its associated actuators. And although each of the control channels are identical, their operating control modes are different. This will be more thoroughly described in a preferred embodiment of the invention.

DESCRIPTION OF THE PREFERRED EMBODIMENT

Figure 1:
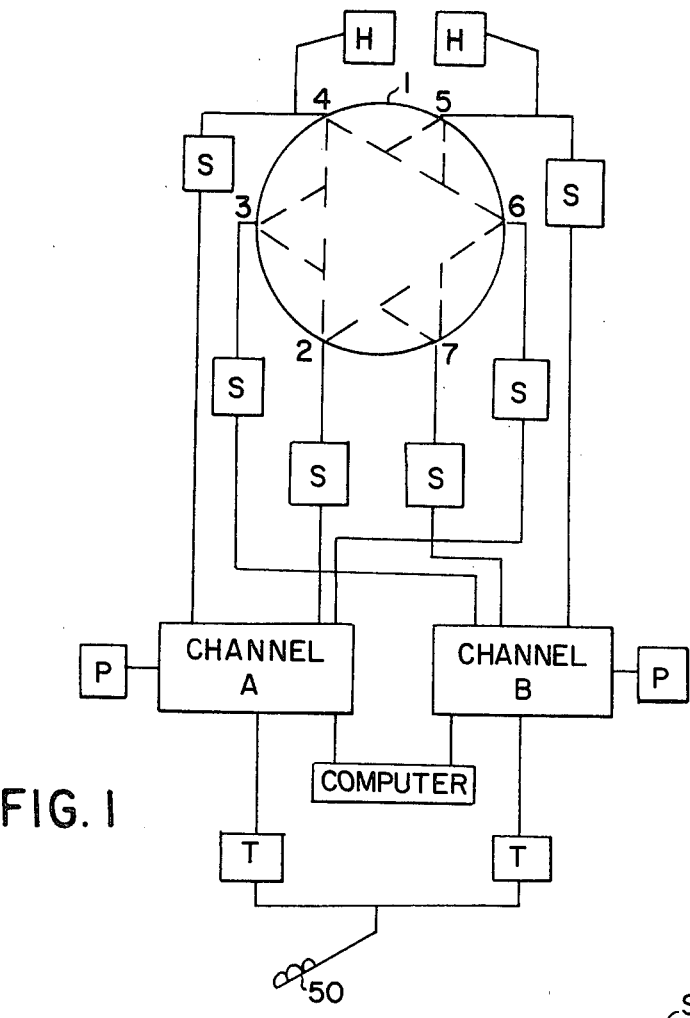
FIG. 1 shows, schematically, the entire swashplate control system, and the location of two series of three swashplate actuators.

In referring to the drawings, and in particular FIG. 1, there is shown a swashplate 1, which is generally circular in configuration. Further, schematically shown are the locations 2, 4 and 6, and 3, 5 and 7 where the swashplate actuators make contact with the underside of the swashplate at particular spaced positions around its near periphery. As can be seen, there are six actuators associated with this particular swashplate, and the actuators are arranged approximately sixty degrees apart. Actually, as previously mentioned, these actuators are clustered into two series, a high force gain or primary control mode, 2, 4 and 6, operated by Channel A, and a low force gain mode, or tracking mode 3, 5 and 7, operated by Channel B. The low force gain mode is the supplemental control for the swashplate. Specifically, the actuators that contact the swashplate at positions 2, 4 and 6, operating in the on line, high force gain or primary control mode, with the high gain pressure feedback providing tracking signals. The three actuators contacting the swashplate at positions 3, 5 and 7 are part of the supplemental control flight system. This disengaged channel is in a standby mode, but is being operated electrically to track the active channel.

Each swashplate (forward and aft) is controlled by either series of three equally spaced precision swashplate servo actuators S. The swashplate servo actuators provide for the exact orientation of the swashplate, thereby precisely regulating the pitch, speed, and blade deflection of the rotary hub and blade assembly, and as a result, the flight pattern of the associated helicopter. The swashplate servo actuators S are shown in detail in FIG. 2. The swashplate servo actuators S are of the integrated electrohydraulic servovalve type, accepting electrical inputs, but driving swashplate actuators hydromechanically. The servo valve, as is known, is a control which is actuated by a feedback system which compares the output with the reference signal and makes corrections to reduce the difference. This will be apparent from FIG. 2 which shows the servo actuators S in detail. The servovalve 20 is a two-stage electrohydraulic servovalve with mechanical feedback from its second stage to a torque motor not shown. The servovalve 20 is operated by electrical signals from servo amplifier 22 which includes a computer (monitor) and electrical connection 24. A linear variable differential transformer 26 indicates second-stage spool position, and a pressure sensor 28, also provided with an output linear variable differential transformer, measures actuator pressure differentials in an equal area hydraulic cylinder 30 which drives swashplate actuator 31. A pair of relief valves 32 limit pressure of hydraulic cylinder 30 to an amount slightly over system pressure. A linear variable differential transformer 34 is mounted inside the piston rod for actuator position feedback. The servo actuator also includes an engage valve 36 which is pressure-operated and is provided with a return spring. It is monitored by a position-indicating switch. A solenoid-operated pilot valve 38 is provided for pressurizing or depressurizing the operating area of engage valve 36.

It will be seen that input electrical signals from servoamplifier 22 to servovalve 20 are converted into mechanical motion by the torque motor which drives hydraulic cylinder 30 using a hydraulic fluid flowing from reservoir H through fluid supply line F and return line R and hydraulic quick connects 39. The electrical signal is an electrohydraulic servovalve command transmitted from servoamplifier 22 in line 40. A pilot valve solenoid signal is carried to electrical connector 24 by line 42. Line 41 carries the electrohydraulic valve spool position feedback signal to the computer or monitor and line 43 is the actuator pressure feedback line. Feedback lines are also provided for monitoring the engage valve position, line 45, and the hydraulic cylinder position, line 47.

It will be apparent that swashplate actuator 31 is operated by hydraulic cylinder 30 by means of the electrohydraulic servovalve 20 actuated by an electrical signal from servoamplifier 22. It can also be seen that by spool position, actuator pressure, engage valve position and cylinder position feedbacks, the operation of each swashplate servo actuator can be monitored. With this understanding, the operation of the invention will now be considered.

Figure 2:
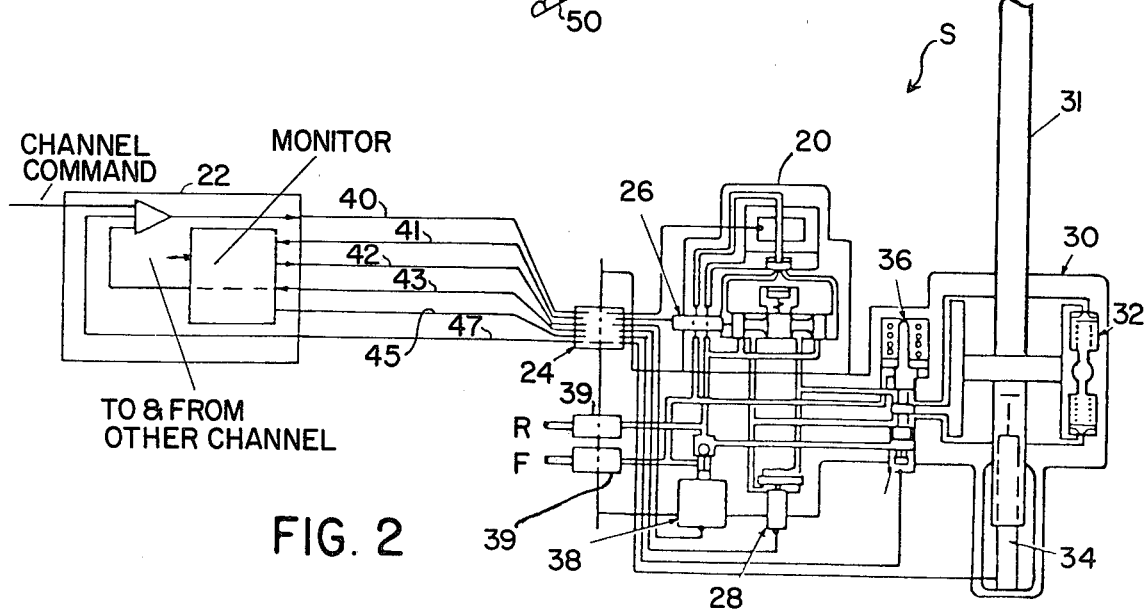
FIG. 2 is a schematic view of a swashplate actuator showing its valves and sensing means.

As can be seen from FIG. 1 there are six servo actuators S such as shown in FIG. 2. The servoamplifiers 22 for three of these are included in control Channel A and the servoamplifiers 22 for the other three actuators S are contained in control Channel B. The swashplate is controlled by actuators 31 located at 2, 4 and 6, and can be controlled by actuators 31 positioned at 3, 5 and 7 on the swashplate. Each of these series has its own power supply P and its own hydraulic fluid reservoir H.

Position transducers T are connected to conventional cockpit stick 50 and pedal controls. Transducer outputs are processed in control Channel A, or control Channel B, and used to operate swashplate servo actuators S controlling the swashplate. Cockpit controls are of an advanced electronically synchronized conventional type consisting of collective pitch lever, directional pedals, and a longitudinal/lateral stick. The control transducers generate electrical signals proportional to control displacement. These are then transmitted as control commands to the control channel electronics for processing and translation to swashplate servoamplifier commands. The on-line channel has a high gain delta P feedback from pressure sensor 28 to circumvent any force-generating capability.

There are two swashplate actuator control Channels A and B, and there are two levels of power involved. One is the signal level (secondary actuation or low force gain) consisting of combinations of electrical, hydraulic, and mechanical power that determine the magnitude of the monitoring level of power. The active and higher power level of the control system is normally hydromechanical and is directly connected to the swashplate to provide actuation. One channel is assigned as active and the other is a tracking channel containing the switching sequence for failures, but both Channels A & B are engaged. Two sum and difference circuits are used, one for the control channel and one for the monitor channel. Electronic signal processing, summing and amplifying is provided in each control unit or channel.

The computer complement, the monitor in FIG. 2, for the control channels vary both in number (redundancy) and type (analog, general purpose digital, and special purpose digital). The computer or monitor in FIG. 2 uses information from the electrohydraulic valve (EHV), the torque motor, EHV spool position, linear variable differential transformer (LVDT), pilot valve solenoid, LVDT pressure sensor, engage valve switch, LVDT actuator position and power supplies. Monitoring of the servos is accomplished by building an electronic digital model of the servo. Upon failure of the active channel, say Channel A, the other channel, in this case Channel B, becomes the active controlling channel. Simultaneously, the previously active Channel A is bypassed and disengaged. In other words, should the computer detect a failure in the active channel, it removes the high-gain pressure feedback from one of the on-line channels, and de-energizes the solenoid on the pilot valve of the active channel. The de-energized solenoid on the pilot valve causes this valve to depressurize the operating area of the engage valve, thereby allowing the spring to move the engage valve to the disengaged position. This action bypasses each cylinder of the failed channel, blocks the output ports of each hydraulic servovalve, and causes the position-indicating switch to indicate first channel disengagement. The bypassed cylinder allows the active cylinder of the other channel, previously disengaged, to assume full control of the swashplate.

Even though control Channels A and B are sufficient, additional control channels can be employed by using dual servo valves 20. Each servovalve 20 can be a dual unit in a common housing. This would make it possible to add two additional monitors and control channels to regulate the position of the swashplate 1, and thereby furnish flight control to the helicopter during flight. Thus, in essence, four flight control systems, each having two electrohydraulic controls for safety purposes, are provided within this invention. Each control channel can fully regulate and render near fail-safe the flight capabilities of the helicopter in which this control system is installed.

Various modifications to the system of this invention will occur to those skilled in the art upon reviewing the subject matter of this disclosure. Any such variations, if within the spirit and scope of this invention, are intended to be protected by any claims to patent protection issuing herein. The description of the preferred embodiment is set forth for illustrative purposes only.

What is claimed is:

1. A helicopter swashplate drive mechanism comprising a first and second series of swashplate actuators spaced around the periphery of a swashplate to effect the control thereof, servo amplifier means including a computer for electronically actuating the first series of actuators to control swashplate operation, the first series thus being primary control swashplate actuators, said servo amplifier means also operating the second series of actuators in a tracking mode, the second series thus being supplemental actuators which track the operational status of the primary actuators, the primary swashplate and the supplemental swashplate actuators being alternately positioned around said swashplate periphery at approximately 60°, said computer separately energizing the two series of actuators for controlling, and for monitoring, swashplate operation whereby the supplemental actuator series assumes operation of the swashplate upon failure of the primary series of actuators.

2. The invention of claim 1 wherein each swashplate actuator is controlled by a servo means.

3. The invention of claim 2 wherein each servo means includes an electrohydraulic servovalve which controls the flow of hydraulic fluid to a hydraulic cylinder to drive said swashplate actuator.

* * * * *